US007090269B2

(12) United States Patent
Kelsey

(10) Patent No.: US 7,090,269 B2
(45) Date of Patent: Aug. 15, 2006

(54) CULINARY APPARATUS

(76) Inventor: Ashley Kelsey, 16 Tracy La., East Islip, NY (US) 11730

( * ) Notice: Subject to any disclaimer, the term of this patent is extended or adjusted under 35 U.S.C. 154(b) by 144 days.

(21) Appl. No.: 10/618,804

(22) Filed: Jul. 14, 2003

(65) Prior Publication Data

US 2005/0012350 A1 Jan. 20, 2005

(51) Int. Cl.
*A47J 43/28* (2006.01)
(52) U.S. Cl. .......................... 294/118; 294/16
(58) Field of Classification Search ................ 294/1.1, 294/3, 8.5, 16, 28, 30, 118; 100/213, 234; 99/440, 441, 442
See application file for complete search history.

(56) References Cited

U.S. PATENT DOCUMENTS

| 818,465 | A | * | 4/1906 | Price ........................... 294/8.5 |
| 1,487,909 | A | * | 3/1924 | Andrews ....................... 99/442 |
| 2,887,948 | A | * | 5/1959 | Kramer et al. ............... 100/213 |
| 3,628,818 | A | * | 12/1971 | Pittman ....................... 294/118 |
| 3,964,775 | A | * | 6/1976 | Boyd ........................... 294/16 |
| 4,073,533 | A | * | 2/1978 | De brey et al. .............. 294/118 |
| 4,494,453 | A | * | 1/1985 | Bentson ........................ 99/353 |
| 4,606,569 | A | * | 8/1986 | Dunn et al. .................. 294/118 |
| 4,773,132 | A | | 9/1988 | Eckels |
| 5,531,347 | A | | 7/1996 | Goulding |
| 5,988,048 | A | * | 11/1999 | Hunter et al. ................. 99/413 |

* cited by examiner

*Primary Examiner*—Dean J. Kramer
(74) *Attorney, Agent, or Firm*—Carter, DeLuca, Farrell & Schmidt LLP

(57) ABSTRACT

An apparatus for holding a pastry item, includes a container member for at least partially containing a pastry item, e.g., a cookie. The container member is dimensioned and configured for insertion into a vessel containing a liquid therein. The container member includes at least one support surface and has at least one aperture extending through the one support surface, whereupon at least partial insertion of the container member within the vessel, the liquid passes through the one aperture to contact the pastry item contained therein. The apparatus may also include a handle member depending from the container member. The handle member is dimensioned for grasping engagement by the user to facilitate insertion and manipulation of the container member within the vessel.

10 Claims, 3 Drawing Sheets

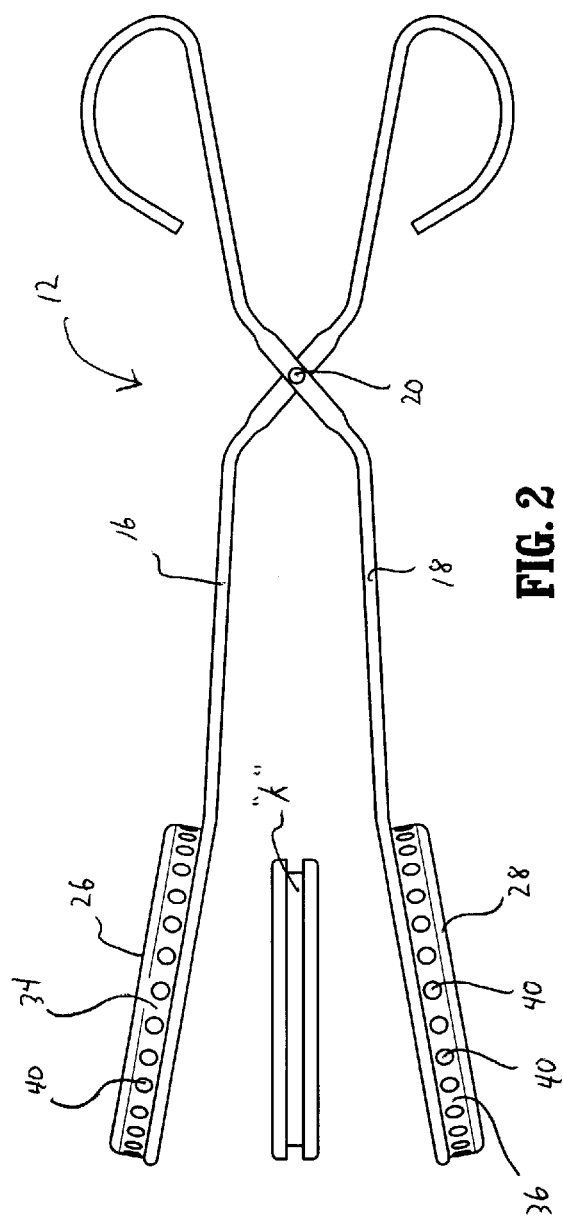
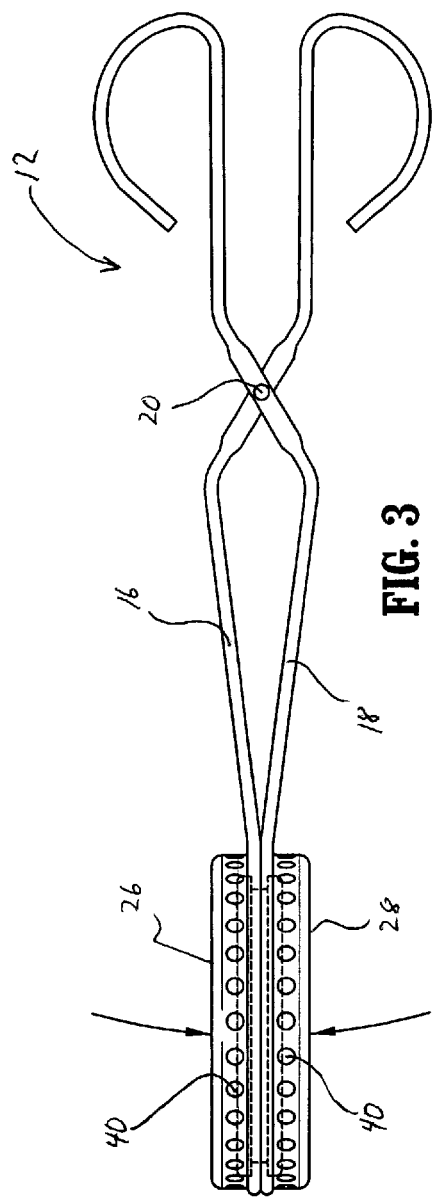

CULINARY APPARATUS

BACKGROUND OF THE INVENTION

1. Field of the Invention

The present invention relates to a culinary apparatus and more particularly to an apparatus for holding an edible item to facilitate submersion of the item into a vessel containing a liquid while permitting communication of the liquid with the item.

2. Description of the Related Art

While partaking in the consumption of an edible item, particularly, for example, a pastry item, and more particularly, a cookie, it often becomes desirable to submerge the item to moisten or at least partially saturate the item to enhance its consumption. However, as most can attest, this maneuver often results in the pastry item becoming overly saturated where the consistency of the item is degraded to a point of crumbling. In addition, and equally as troubling, is the residue of item material which inevitably migrates to the consumer's fingers and hands.

SUMMARY OF THE INVENTION

Accordingly, the present disclosure is directed to a culinary apparatus and associated method for facilitating at least partial submersion of an edible item within a vessel containing a liquid. Generally stated, the preferred apparatus for holding a pastry item, includes a container member for at least partially containing a pastry item. The container member is dimensioned and configured for insertion into a vessel containing a liquid therein. The container member includes at least one support surface and has at least one aperture extending through the one support surface, whereupon at least partial insertion of the container member within the vessel, the liquid passes through the one aperture to contact the pastry item contained therein. The apparatus may also includes a handle member depending from the container member. The handle member is dimensioned for grasping engagement by the user to facilitate insertion and manipulation of the container member within the vessel.

The preferred container member includes first and second opposed support surfaces with the support surfaces arranged to support the pastry item therebetween. The first support surface may be adapted for movement relative to the second support surface between a first open position to facilitate positioning of the pastry item at least partially between the support surfaces and a second approximated position where the pastry item is supported between the support surfaces. The handle member includes a movable member operatively connected to the first support element and is movable to effect movement of the first support element between first and second positions.

The container member may include an enclosure member which defines a cavity for reception of the pastry item. The enclosure member is dimensioned to accommodate a cookie.

A method for dunking a pastry item within a vessel containing a fluid therein is also disclosed. The method includes the steps of:

providing a pastry holder including opposed support elements arranged to support a pastry therebetween, at least one support element including an aperture therein;

positioning a pastry item between the opposed support elements whereby the pastry item is contained within the pastry holder; and inserting the pastry holder within the vessel to at least partially submerge the pastry item in the fluid whereby the fluid passes through the aperture to contact the pastry item.

Preferably, the pastry item is a cookie whereby the step of inserting includes submerging at least a portion of the cookie in the fluid of the vessel.

BRIEF DESCRIPTION OF THE DRAWINGS

Preferred embodiments of the present invention will be readily appreciated from the foregoing discussion with reference to the drawings wherein:

FIG. 2 is a side plan view of the culinary apparatus in an open position;

FIG. 3 is a side plan view of the culinary apparatus in a closed position; and

DETAILED DESCRIPTION OF PREFERRED EMBODIMENTS

The present invention is directed to a culinary apparatus facilitating the submersion, i.e., at least partial submersion, of an edible item within the consumable liquid. The apparatus may be used with any edible item contemplated for submersion within a moistening element. Such edible items include bread, crackers, pasta, etc., and preferably include pastry items such as donuts, cakes, muffins, etc. The apparatus has particular application in use with submerging or dunking a cookie item within a beverage such as coffee, tea, milk or soda and will be described in connection with this use in the remaining discussion.

For the following discussion, the term proximal as is traditional will refer to the portion of the apparatus closest to the operator while the term distal will refer to the portion of the instrument most remote from the operator.

Figure 1:
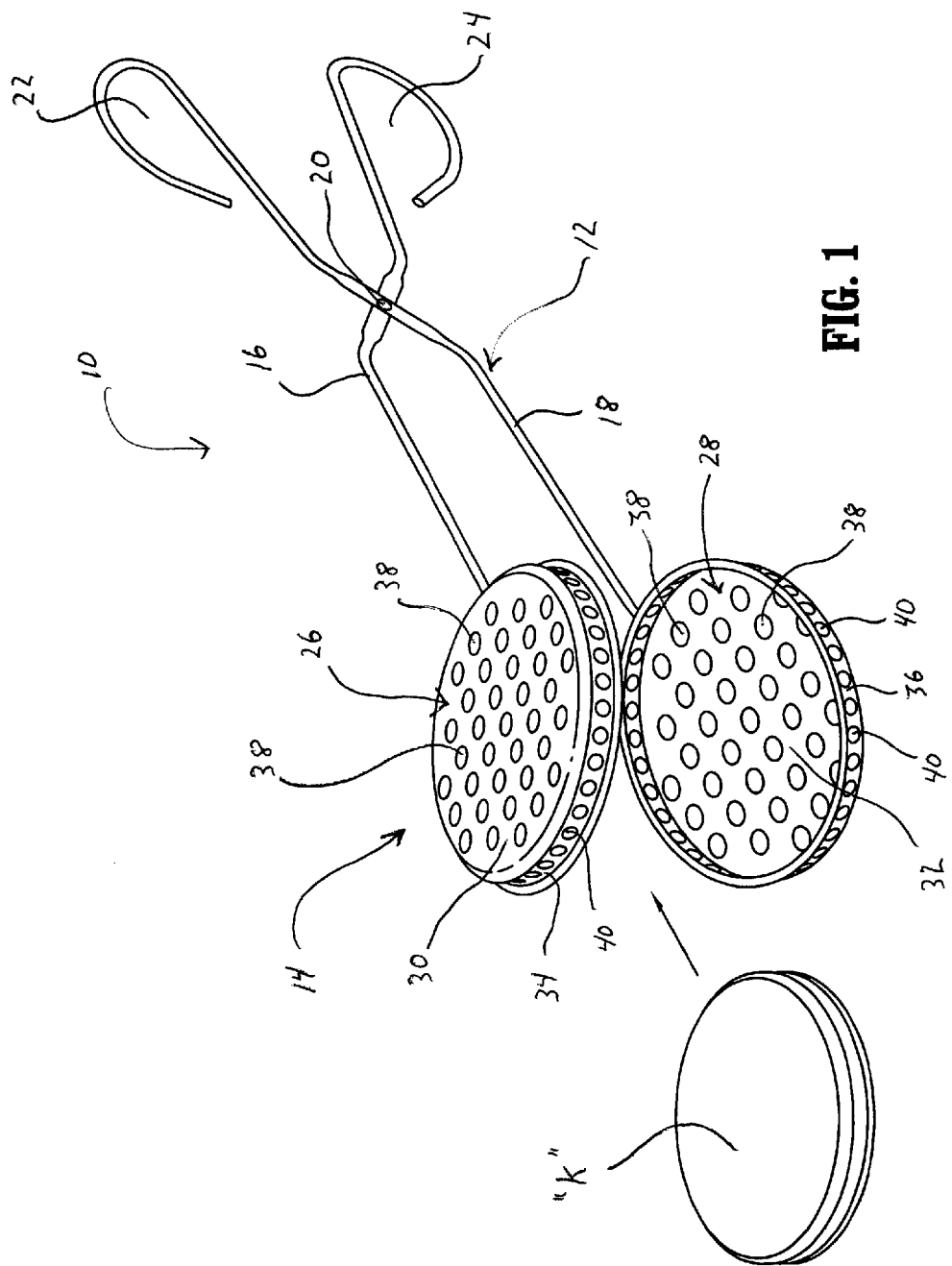
FIG. 1 is a perspective view of the culinary apparatus of the present disclosure.
Figure 4:
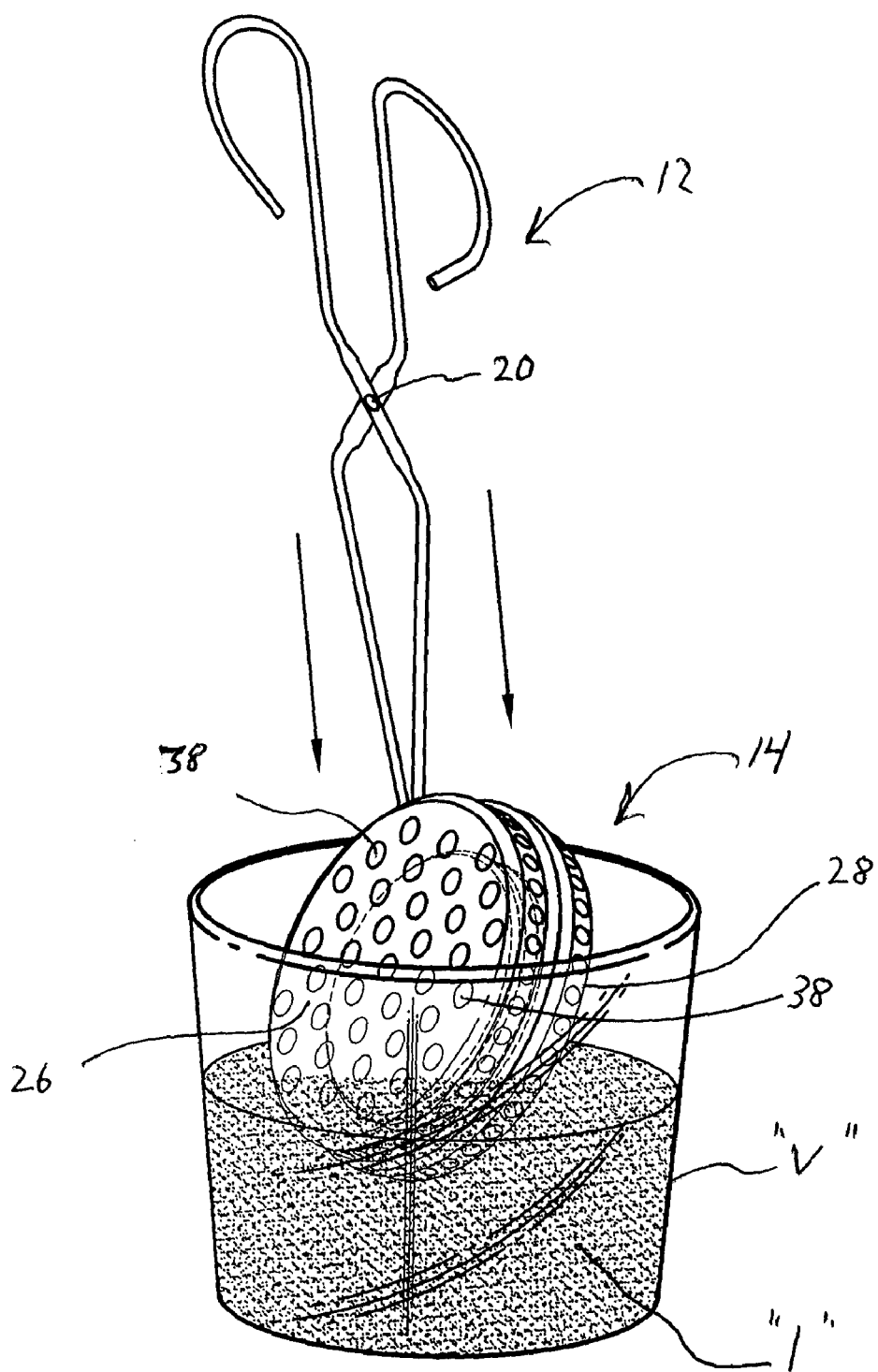
FIG. 4 is a view illustrating submersion of the culinary apparatus within a vessel containing a liquid.

Referring now to FIG. 1, there is illustrated in perspective view the apparatus of the present invention. Culinary apparatus 10 includes handle 12 defining longitudinal axis "a" and holder 14 disposed distal of the handle. Handle 12 includes first and second handle elements 16, 18 pivotally connected to each other about pivot pin 20. Handle element 16, 18 are adapted for pivotal total movement between an open position depicted in FIG. 2 and a closed position depicted in FIG. 3 to control respective opening and closing movement of holder 14. Although shown in this embodiment as two pivoting elements, it is envisioned that handle 12 may include a stationary handle element and a moveable handle element connected to each other through the aforementioned pivotal means or with the use of a camming pin/slot arrangement. Other handle mechanisms are also envisioned. First and second handle elements 16, 18 also include looped segments 22, 24 for receiving the fingers of the consumer to assist in manipulation of the apparatus 10.

With continued reference to FIGS. 1–3, holder 14 includes first and second containers 26, 28 connected to respective handle elements 16, 18. In a preferred embodiment, first and second containers 26, 28 are fixedly secured to handle elements 16, 18. Alternatively, first and second containers 26; 28 may be mounted for rotational movement relative to the handle elements 16, 18. One skilled in the art may readily adapt containers 26, 28 for such relative movement.

Each container 26, 28 includes longitudinal (horizontal) support surfaces 30, 32 and transverse wall 34, 36 depending from the surfaces 30, 32. Surfaces 30, 32 define a plurality of apertures 38 extending completely through the wall for permitting passage of a fluid through the surfaces. Transverse walls 34, 36 each extend along the periphery of their respective containers 26, 28. Transverse walls 34, 36 may also include apertures 40 to permit passage of fluid or optimally be devoid of the apertures.

Apparatus 10 may be fabricated from any suitable generally rigid material including stainless steel, silver, or a polymeric material and/or a combination of these materials. Preferably, the materials of fabrication chosen may be readily cleaned by hand or a dishwashing unit.

In use, a cookie "K" is selected and positioned between the open containers 26, 28 as shown in FIG. 2. Handle elements 16, 18 are then moved toward each other to effect closure of the containers 26, 28 as depicted in FIG. 3. In this position, containers 26, 28 define a bonded internal cavity for reception and support of the cookie "K". Once in the closed position, holder 14 is at least partially submerged or dunked within a vessel "V" containing a liquid "L". The liquid "L" communicates through apertures 38, 40 of containers 26, 28 to moisten and/or at least partially saturate the cookie "K". After a defined period, the apparatus 10 is removed from the liquid "L", containers 26, 28 are moved to their open position of FIG. 2 and the cookie "K" removed for consumption.

It will be understood that various modifications may be made to the embodiments disclosure herein. Therefore, the above description should not be construed as limiting, but merely as exemplifications of preferred embodiments. For example, it is envisioned that each of the support surfaces 30, 32 of containers 26, 28 may include only one opening. Alternatively only one container may have an opening with the other container having a solid support surface. Similarly only one container may be provided with a transverse wall while the other container is disc-shaped devoid of the wall. Containers 26, 28 may take various shapes and forms for example to accommodate the various configurations of commercially available cookies, including, oval-shaped, round, rectangular, disc-shaped, square etc . . . Those skilled in the art will envision other modifications within the scope and spirit of the claims appended hereto.

What is claimed:

1. A method for at least partially immersing a pastry item within a vessel containing a fluid therein, comprising the steps of:

providing a pastry holder including opposed first and second container members operatively connected to each other and adapted for relative movement between respective open and approximated positions, at least one of said first and second container members including an aperture therein;

manipulating a handle operatively connected to said pastry holder to cause said first and second container members to assume said open position;

positioning a cookie between said first and second container members;

manipulating said handle to cause said first and second container members to assume said approximated position whereby the cookie is substantially contained within said pastry holder; and inserting said pastry holder within the vessel to at least partially submerge the cookie in the fluid of the vessel whereby the fluid passes through said aperture to contact the cookie.

2. The method according to claim 1 wherein said at least one of said first and second container members includes a plurality of apertures and wherein during the step of inserting the fluid passes through said apertures to contact the cookie.

3. The method according to claim 2 wherein each said first and second container members include a plurality of apertures and wherein during the step of inserting the fluid passes through said apertures of each of said first and second containers to contact the cookie.

4. A method for at least partially immersing a pastry item within a vessel containing a fluid therein, comprising the steps of:

providing a pastry holder including opposed first and second container members operatively connected to each other and adapted for relative movement between respective open and approximated positions, at least one of said first and second container members including an aperture therein, at least one of said first and second container members includes a support wall and a transverse wall disposed about the periphery of said support wall and depending therefrom;

manipulating a handle operatively connected to said pastry holder to cause said first and second container members to assume said open position;

positioning a pastry item between said first and second container members;

manipulating said handle to cause said first and second container members to assume said approximated position, whereby said first and second container members define an internal cavity to substantially enclose the pastry item; and inserting said pastry holder within the vessel to at least partially submerge the pastry item in the fluid whereby the fluid passes through said aperture to contact the pastry item.

5. The method according to claim 4 wherein each said first and second container members includes a support wall and a transverse wall disposed about the periphery of said support wall and depending therefrom, whereby, upon the step of manipulating said handle to cause said first and second container members to assume said approximated position, said first and second container members define the internal cavity to substantially enclose the pastry item.

6. The method according to claim 4 wherein said at least one of said first and second container members includes a plurality of apertures and wherein during the step of inserting the fluid passes through said apertures to contact the pastry item.

7. The method according to claim 6 wherein each said first and second container members include a plurality of apertures and wherein during the step of inserting the fluid passes through said apertures of each of said first and second containers to contact the pastry item.

8. The method according to claim 4 wherein the pastry item is a cookie.

9. A method for at least partially immersing a pastry item within a vessel containing a fluid therein, comprising the steps of:

providing a pastry holder including opposed first and second container members operatively connected to each other and adapted for relative movement between respective open and approximated positions, at least one of said first and second container members including an aperture therein;

manipulating a handle operatively connected to said pastry holder to cause said first and second container members to assume said open position;

positioning a pastry item between said first and second container members;

manipulating said handle to cause said first and second container members to assume said approximated position whereby the pastry item is substantially contained within said pastry holder; and inserting said pastry holder within the vessel to at least partially submerge the pastry item in the fluid whereby the fluid passes through said aperture to contact the pastry item; and wherein said handle includes first and second handle elements operatively connected to each other, said first handle element adapted to move relative to said second handle element, wherein during the steps of manipulating, said first handle element is moved relative to said second handle element to cause said first and second container members to move between respective open and approximated positions.

10. The method according to claim 9 wherein the pastry item is a cookie.

* * * * *